US008270301B2

(12) United States Patent
Alicherry et al.

(10) Patent No.: US 8,270,301 B2
(45) Date of Patent: Sep. 18, 2012

(54) DELAY DISTRIBUTED VIRTUALLY-CONCATENATED DATA TRAFFIC

(75) Inventors: Mansoor Ali Khan Alicherry, Scotch Plains, NJ (US); Harsha S. Nagesh, Berkeley Heights, NJ (US); Chitra A. Phadke, Basking Ridge, NJ (US); Viswanath Poosala, Middlesex, NJ (US)

(73) Assignee: Alcatel Lucent, Paris (FR)

( * ) Notice: Subject to any disclaimer, the term of this patent is extended or adjusted under 35 U.S.C. 154(b) by 860 days.

(21) Appl. No.: 11/025,100

(22) Filed: Dec. 29, 2004

(65) Prior Publication Data

US 2006/0140116 A1 Jun. 29, 2006

(51) Int. Cl.
*G01R 11/00* (2006.01)
(52) U.S. Cl. .......................... 370/238; 370/230; 370/231
(58) Field of Classification Search .................. 370/392, 370/471, 458, 437, 395.51, 351, 536, 238, 370/516, 230, 503; 398/43, 51; 372/144, 372/262
See application file for complete search history.

(56) References Cited

U.S. PATENT DOCUMENTS

| | | | | |
|---|---|---|---|---|
| 5,381,404 A | * | 1/1995 | Sugano et al. | 370/238 |
| 5,805,602 A | * | 9/1998 | Cloutier et al. | 370/516 |
| 6,697,373 B1 | * | 2/2004 | Sandstrom | 370/405 |
| 7,058,056 B2 | * | 6/2006 | Yehuda et al. | 370/536 |
| 7,508,830 B1 | * | 3/2009 | Suh et al. | 370/393 |
| 2004/0213268 A1 | * | 10/2004 | Gupta et al. | 370/395.51 |
| 2005/0041692 A1 | * | 2/2005 | Kallstenius | 370/503 |
| 2005/0286425 A1 | * | 12/2005 | Nagesh et al. | 370/238 |
| 2006/0072540 A1 | * | 4/2006 | Grimbergen | 370/351 |
| 2006/0133430 A1 | * | 6/2006 | Nagesh et al. | 370/536 |

OTHER PUBLICATIONS

U.S. Appl. No. 10/446,220, filed May 28, 2003, S. Acharya et al.
U.S. Appl. No. 10/745,881, filed Dec. 26, 2003, S. Acharya et al.
U.S. Appl. No. 10/856,444, filed May 28, 2004, H.S. Nagesh et al.
U.S. Appl. No. 10/949,638, filed Sep. 24, 2004, S. Acharya et al.
U.S. Appl. No. 10/853,422, filed May 25, 2004, S. Acharya et al.

(Continued)

*Primary Examiner* — David Oveissi
(74) *Attorney, Agent, or Firm* — Ryan, Mason & Lewis, LLP

(57) ABSTRACT

Network design techniques and techniques for routing virtually-concatenated data traffic in a network in a manner which distributes delay to intermediate nodes of the network are disclosed. For example, in one aspect of the invention, a technique for routing virtually-concatenated data traffic in a network comprising a plurality of nodes comprises, for a given traffic demand to be routed from a source node to a destination node in the network, the following steps/operations. Two or more paths are determined to route the given traffic demand. Each of the two or more paths correspond to a member of a virtually-concatenated group. At least one path of the two or more paths comprises the source node, the destination node and at least one other node coupled between the source node and the destination node. Further, at least a subset of the source node, the destination node and the one other node buffer at least a portion of the given traffic demand such that a delay is distributed over the at least one path. The given traffic demand is routed over the two or more determined paths. The at least one path is preferably the shorter of the two or more determined paths.

20 Claims, 6 Drawing Sheets

OTHER PUBLICATIONS

J. Edmonds et al., "Theoretical Improvements in Algorithmic Efficiency for Network Flow Problems," Journal of ACM, vol. 19, No. 2, pp. 248-264, Apr. 1972.

James B. Orlin, "A Faster Strongly Polynomial Minimum Cost Flow Algorithm," Proceedings of the 20th ACM Symposium on the Theory of Computing, pp. 377-387, 1988.

G. Garg et al., "Managing Differential Delay in SONET Architectures," EE Times, pp. 1-5, Jan. 2002.

D. Karger et al., "On Approximating the Longest Path in a Graph," Algorithmica 18, pp. 1-17, 1997.

ITU-T Recommendation G.7042/Y.1305—Corrigendum 1, "Link Capacity Adjustment Scheme (LCAS) for Virtual Concatenated Signals," 16 pages, 2002.

ITU-T Recommendation G.7042/Y.1305, "Link Capacity Adjustment Scheme (LCAS) for Virtual Concatenated Signals," 24 pages, 2001.

ITU-T Recommendation G.707/Y.1322, "Network Node Interface for the Synchronous Digital Hierarchy," 184 pages, 2000.

* cited by examiner

DELAY DISTRIBUTED VIRTUALLY-CONCATENATED DATA TRAFFIC

RELATED APPLICATIONS

The present invention is related to the inventions described in U.S. patent application Ser. No. 10/446,220, filed May 28, 2003 and entitled "Fast Restoration for Virtually-Concatenated Data Traffic," U.S. patent application Ser. No. 10/745,881 filed Dec. 26, 2003 and entitled "Route Determination Method and Apparatus for Virtually-Concatenated Data Traffic," U.S. patent application Ser. No. 10/856,444, filed May 28, 2004 and entitled "Route Determination with Differential Delay Compensation For Virtually-concatenated Data Traffic," and U.S. patent application Ser. No. 10/949,638, filed Sep. 24, 2004 and entitled "Differential Delay Constrained Routing For Virtually-concatenated Data Traffic", the disclosures of which are incorporated by reference herein.

FIELD OF THE INVENTION

The present invention relates generally to data communication networks which utilize virtual concatenation. More particularly, the invention relates to techniques for routing virtually-concatenated data traffic in a network in a manner which distributes delay to intermediate nodes of the network.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node. The destination node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

The above-cited U.S. patent application Ser. No. 10/446,220 and Ser. No. 10/745,881 provide additional performance improvements beyond those associated with the conventional VC and LCAS protocols.

When implementing VC or LCAS related techniques, it is often necessary to provide compensation for differential delays of the diverse routes over which the various members of a VCG are transmitted.

The above-cited U.S. patent application Ser. No. 10/856,444 and Ser. No. 10/949,638 provide performance techniques which provide differential delay compensation for VCAT data traffic.

Thus, as is known, a main idea behind the VCAT scheme is to enable the transport of traffic of a large payload size by effectively dividing it into smaller payloads, carrying each payload separately over different paths to the destination, and then reassembling it at the destination nodes. However, this requires the availability of large memory buffers at the destination nodes to reassemble the original traffic and can become a bottleneck in supporting traffic.

Accordingly, a need exists for improved techniques for routing virtually-concatenated data traffic, which substantially reduce memory requirements of buffers at destination nodes.

SUMMARY OF THE INVENTION

The present invention provides network design techniques and techniques for routing virtually-concatenated data traffic in a network in a manner which distributes delay to intermediate nodes of the network.

For example, in one aspect of the invention, a technique for routing virtually-concatenated data traffic in a network comprising a plurality of nodes comprises, for a given traffic demand to be routed from a source node to a destination node in the network, the following steps/operations. Two or more paths are determined to route the given traffic demand. Each of the two or more paths correspond to a member of a virtually-concatenated group. At least one path of the two or more paths comprises the source node, the destination node and at least one other node coupled between the source node and the destination node. Further, at least a subset of the source node, the destination node and the one other node buffer at least a portion of the given traffic demand such that a delay is distributed over the at least one path. The given traffic demand is routed over the two or more determined paths. The at least one path is preferably the shorter of the two or more determined paths.

Also, by way of example, the subset of nodes may comprise the source node, the destination node and the at least one other node. By way of alternative example, the subset of nodes may comprise one or more of the source node and the at least one other node. That is, any combination of nodes that distribute the delay over the at least one path may be utilized. Also, each buffering node may buffer the traffic so as to provide the same delay or buffering nodes may provide different delays.

Accordingly, a differential delay associated with the two or more determined paths may be substantially reduced at the destination node due to the delay associated with the at least one path being distributed over the at least one path. Also, a buffer size required at the destination node may be substantially minimized due to the delay associated with the at least one path being distributed over the at least one path. Distribution of the delay over the at least one path also permits traffic on the network that would otherwise not be admissible.

Further, each of the source node, the destination node and the one other node of the at least one path may delay at least a portion of the given traffic demand by a fixed amount. Still further, respective members of the virtually-concatenated group may be recombined at the destination node.

Advantageously, the delay distributed virtual concatenated techniques of the invention distribute buffers to intermediate nodes and thereby introduce delays in the paths so that the net buffer required at the destination nodes is reduced. Advantages of such a scheme are reduced buffer requirements on nodes and the ability to support more traffic in the network.

These and other objects, features and advantages of the present invention will become apparent from the following detailed description of illustrative embodiments thereof, which is to be read in connection with the accompanying drawings.

DETAILED DESCRIPTION OF THE INVENTION

Figure 1:
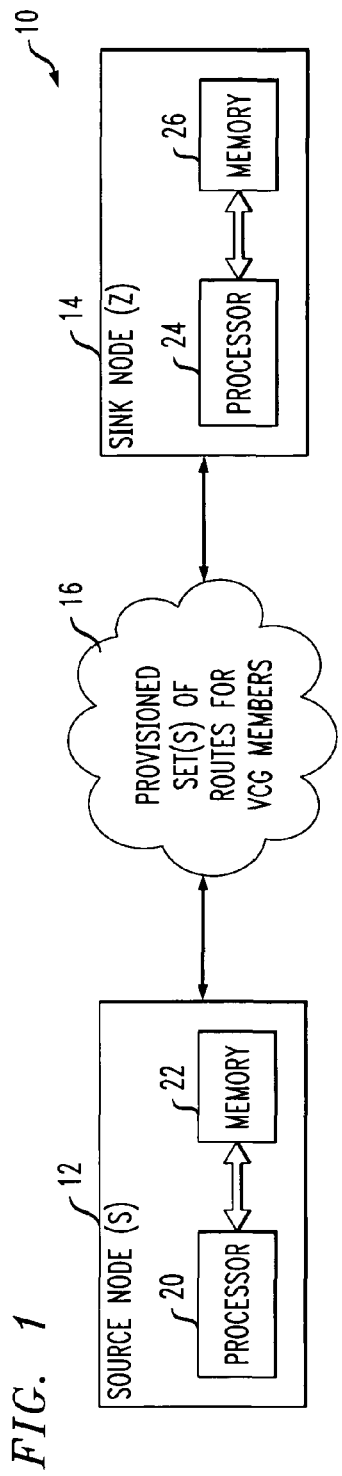
FIG. 1 illustrates a portion of a data transmission network in which the invention may be implemented.

The invention will be illustrated herein in conjunction with illustrative embodiments of routing and design algorithms, as well as a network-based system and example network nodes in which the algorithms may be implemented. It should be understood, however, that the invention is not limited to use with the particular routing or design algorithms, network-based system or network node implementations described, but is instead more generally applicable to any routing or design application, network-based system or node implementation in which it is desirable to distribute delay associated with virtually-concatenated data traffic over intermediate nodes of the network rather than just at a destination node.

As used herein, an "intermediate node" generally refers to a node in a path other than the destination node. This may include the source node and nodes between the source node and the destination node. However, it is to be understood that any given node may function as one of an intermediate node and a destination node for one traffic flow, and then function as another one of an intermediate node and a destination node for another traffic flow.

Before describing principles of the invention relating to delay distributed virtual concatenation, some general principles of data concatenation will be described.

It is known that SONET/SDH networks have become a preferred standard for optical transport of communications traffic. SONET has evolved over the years to a stable, better manageable survivable network that can be deployed in a ring as well as mesh topologies and with different configurations such as a Unidirectional Path Switched Ring (UPSR) and a Bidirectional Line Switched Ring (BLSR). To carry traffic of different bandwidths, SONET standards define a hierarchical model.

For example, three STS-1 data rate streams are multiplexed to create an STS-3 stream, where STS denotes "synchronous transport signal." Four STS-3 streams are multiplexed into a STS-12 stream, and so on. This hierarchical structure enables easy aggregation and trunking of lower rate streams carrying voice traffic.

However, over time, links can get fragmented or capacity can be exhausted on existing links to carry higher order traffic. Due to such conditions, it became evident that it was necessary to define a concatenation standard to enable that traffic to be carried in a best effort manner. The contiguous concatenation standard, which is part of the SONET standards, was developed whereby high-speed data applications that use protocols, such as ATM, EoS and others, are carried over existing SONET payloads.

In such cases, multiple payloads are transported (and switched) across the SONET network as a single connection with the first SONET container payload pointer set in a normal mode, and the subsequent payload pointers set to a concatenation mode, thus linking all the units together.

In line with the SONET hierarchy, these contiguously concatenated containers and corresponding rates defined are:

STS-3c-149.76 Mbps
STS-12c-599.04 Mbps
STS-48c-2396.16 Mbps
STS-192c-9584.64 Mbps However, contiguous concatenation suffers from many issues such as lack of support from legacy equipment, non-availability of contiguous smaller order concatenation containers to carry the higher order payload, and need for smaller granularity of higher order traffic. For example, one would need to over-allocate a STS-48c to carry a 1000 megabits per second (Mbps) Ethernet service.

In order to address these limitations, virtual concatenation was developed based on an inverse multiplexing procedure whereby the contiguous bandwidth is broken into individual SONET Payload Envelopes (SPEs) at the source transmitter and logically represented in a virtual concatenation group (VCG). The VCG members are transported as individual SPEs across the SONET network and recombined at the far end destination VCG receiver. The VCG members may go over the same path or diverse paths resulting in different arrival delays at the destination receiver. This is referred to as "differential delay." A sequencing scheme helps to reorder the individual members and reconstruct the original payload. Buffers are typically needed to accommodate the maximum differential delay at the destination node. That is, some VCG members must be buffered until other VCG members are received. In traditional VCAT, such buffering is done at the destination node, giving rise to substantial differential delays and, thus, substantial storage requirements.

Referring now to FIG. 1, a data transmission network 10 includes a source node 12, a sink node 14, and a provisioned set of routes 16 for VCG members. It is to be appreciated that the figure shows only a portion of a typical network, for simplicity and clarity of description.

The source and sink nodes are also denoted herein as S and Z nodes, respectively. The source node 12 includes a processor 20 coupled to a memory 22. Similarly, the sink node 14 includes a processor 24 coupled to a memory 26. The memory elements of the nodes 12, 14 store one or more software programs for execution by the corresponding processors in implementing virtual concatenation operations such as forming VCGs and determining appropriate routes for VCG members, using the above-noted G.707 and G.7042 standards documents, or other communication protocols. The conventional aspects of the operation of nodes 12, 14 in transmitting virtually-concatenated data traffic through network 10 are well known in the art and therefore will not be described in detail herein.

Figure 2:
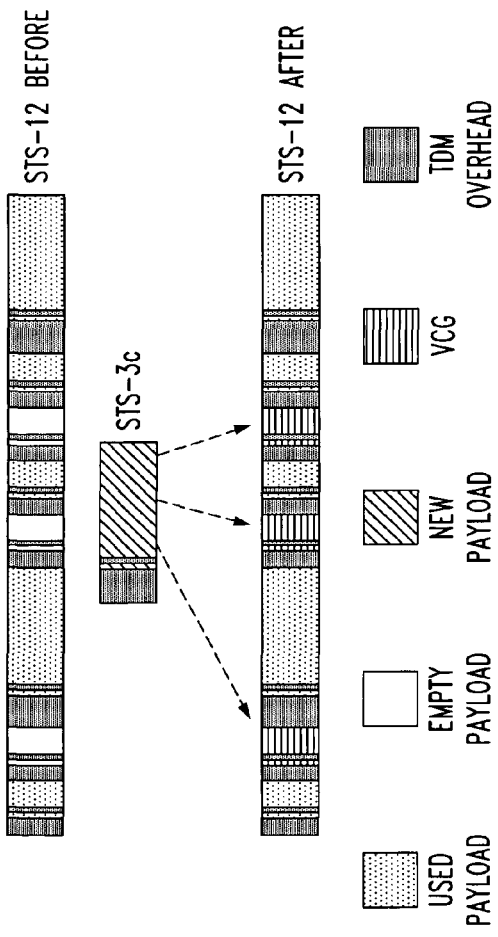
FIG. 2 shows an example of a synchronous transport signal virtually concatenated into three synchronous transport signals.

FIG. 2 shows an example of an STS-3c stream virtually concatenated into three STS-1 s streams. The legend in FIG. 2 shows parts of the stream, namely, user payload, empty payload, new payload, VCGs, and time division multiplexed (TDM) overhead.

As previously mentioned, the different SPEs in a VCAT scheme can go over different paths and hence have different delays when they reach the destination nodes. VCAT handles the different propagation delay associated with individual SPEs in the VCG using a sequencing mechanism. This is done by buffering data associated with individual SPEs at the destination and combining them when the data for the longest delay SPE arrives. This requires a significant amount of high-speed memory at the destination.

For example, for a virtual concatenated payload of STS-Xv, with each of the SPEs as a STS-1 having delays $d1$, $d2$, ..., $dx$, the memory required at the destination node is:

$$(X * \text{Max} di - \Sigma di) * 49.92 \text{ Mbits}$$

The VCAT standard allows for a maximum differential delay of 256 milliseconds (msec). To accommodate this delay in the system, the worst case memory needed for an OC-192 port is 320 megabytes per port (MB/port). Existing systems are usually designed for 32 msec differential delay, which would require a memory of 40 MB/port.

To improve the efficacy of VCAT, the present invention provides techniques that enable networks to tolerate higher differential delays while reducing the total buffer required at each individual node.

Assume for the moment that the differential delay of the SPEs in a VCG was zero. In such case, no buffer is needed at the destination. The invention realizes that by decreasing the differential delays or, in other words, increasing the delays of paths that do not have sufficient delay, the buffer required at the destination node can be reduced. This inventive principle is referred to herein as delay distributed VCAT.

Introducing delays at the intermediate nodes of the smaller delay path can increase its delay. Buffering the data at the intermediate nodes will achieve this delay. So instead of having one large buffer at the destination node, the invention provides for distributing this buffer along all (or some subset) of the intermediate nodes in the individual paths of the VCG. It is to be appreciated that the source node can also be considered an intermediate node and thus such a buffer can also be provided at the source node. Each buffer delays the path by a fixed amount thereby reducing the total differential delay of the paths at the destination node and hence the buffer requirement at the destination node. Different nodes may delay the traffic by the same amount or different amounts.

Note that delay distributed VCAT does not decrease the total buffer required for a VCG. However, it distributes the buffer required to more of the network or makes use of unused buffers at other nodes. Routing using such a design principle is illustrated in the following figure.

Figure 3A:
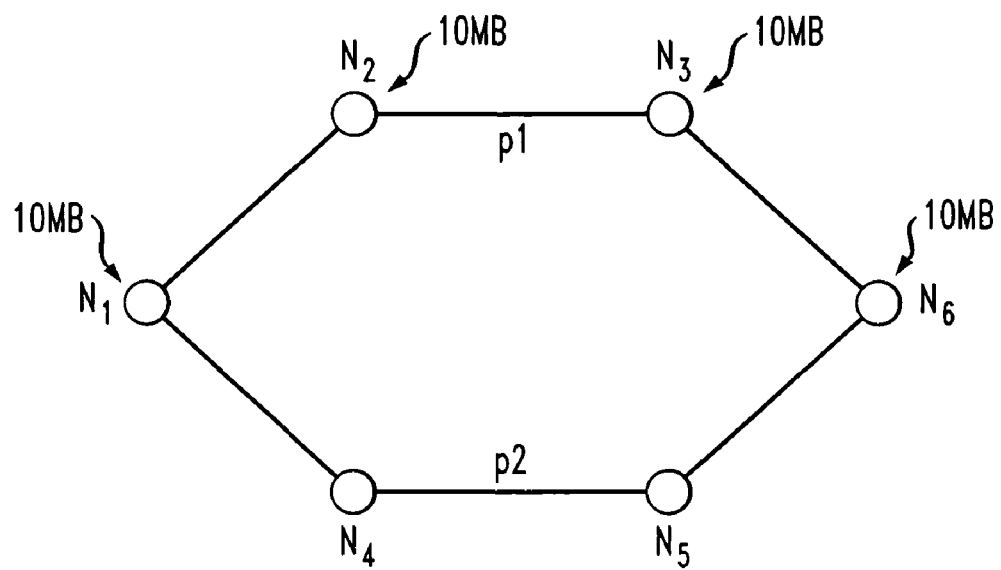
FIG. 3 shows a delay distributed routing technique and at least one advantage thereof, according to an embodiment of the invention.

FIG. 3A shows a delay distributed routing technique and at least one advantage thereof, according to an embodiment of the invention. In FIG. 3A, nodes $N_1$ through $N_6$ are shown. For this example, node $N_6$ is considered the destination node. Further, as shown, assume the VCG contains two paths, p1 and p2, where p2 has a higher delay than p1.

Assume that the differential delay warrants a total of 40 MB of buffer space to support the VCAT payload. In traditional VCAT, this 40 MB has to be present at the destination node ($N_6$). In delay distributed VCAT, this 40 MB can be distributed in any way along path p 1. For example, as the figure shows, this memory requirement is distributed equally along the path, i.e., 10 MB each at $N_1$, $N_2$, $N_3$ and $N_6$. Advantageously, by introducing delays by way of buffering at intermediate nodes, i.e., nodes other than the destination node, the invention serves to reduce the total buffer requirement at the destination node.

Furthermore, delaying the shorter of the VCAT paths by way of buffering at the intermediate nodes has many advantages, some of which are explained below.

First, delaying the shorter of the VCAT paths by way of buffering at the intermediate nodes permits more traffic in the network. Because, in delay distributed VCAT, the net buffer required at the destination node is less than in traditional VCAT, traffic that was otherwise not permissible because of buffer limitations can now be admitted by spreading the buffer (delay) to the intermediate nodes. Thus, the network is able to admit more traffic than previously possible.

Also, though the VCAT standard currently sets the maximum possible differential delay to 256 msec, most networks and equipment are only designed for 32 msec of delay. This can restrict the possible paths and hence traffic that may be supported. By using intermediate buffers, larger delays can be effectively tolerated and, hence, the network can admit more traffic than before.

Figure 3B:
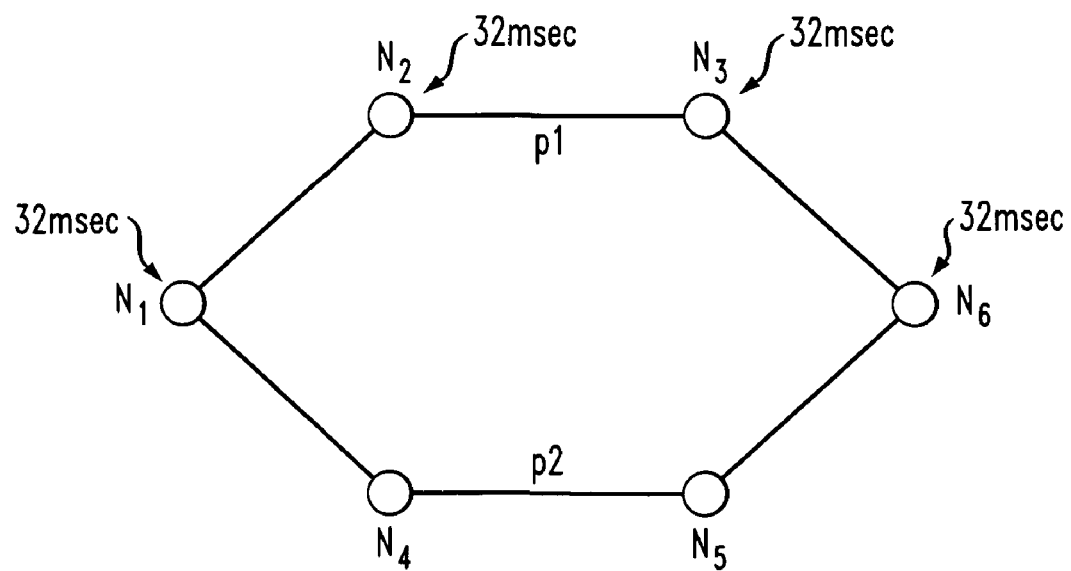

For a fixed buffer space, delay distributed VCAT increases the maximum differential delay allowed in the network. For example, with a system designed for 32 msec for traditional VCAT, the invention serves to achieve 128 msec differential delay over a path of three hops. This is illustrated in FIG. 3B where nodes $N_1$, $N_2$, $N_3$ and $N_6$ each permit a delay of 32 msec. Higher differential delay leads to more paths in the network. So more traffic in the system may be accommodated.

Thus, because of less stringent buffer requirements on the nodes, and the ability to tolerate higher differential delays, the delay distributed VCAT techniques of the invention give more flexibility in the routing and the ability to accommodate more traffic than traditional VCAT schemes allow.

Second, delaying the shorter of the VCAT paths by way of buffering at the intermediate nodes yields reduced total buffer space requirements on the network. Because delay distributed VCAT makes use of buffers at intermediate nodes, it makes more effective use of overall buffers in the network. Also, by making use of "unused" buffers on nodes, the total buffer requirement on the network elements may be reduced. Of course, one has to note that while the total buffer "used" in both schemes is the same, the effective distribution makes the delay distributed VCAT scheme more attractive from a network design perspective and gives the ability to design network elements with overall less buffer capacity. This can be explained by the following example.

Figure 4A:
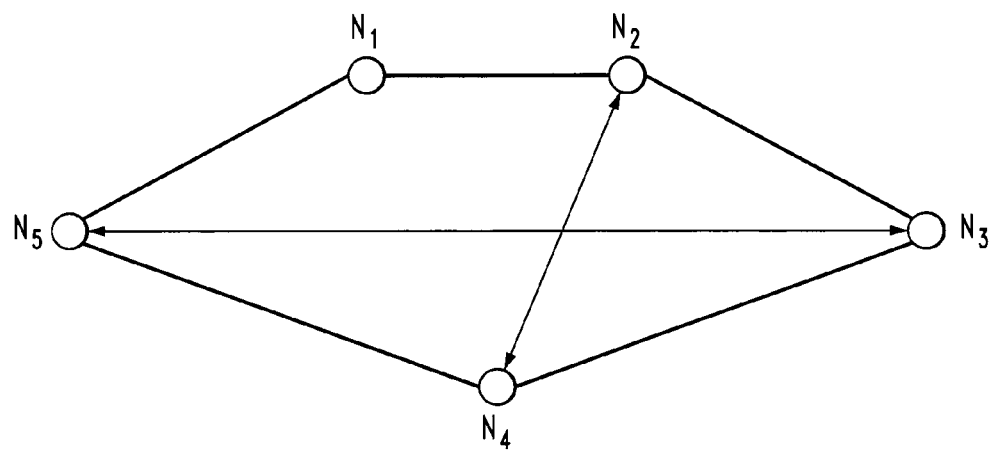
FIG. 4 shows a delay distributed routing technique and at least another advantage thereof, according to an embodiment of the invention.

Consider a ring of five nodes $N_1$ through $N_5$, as shown in FIG. 4A. Let each of the links have an effective bandwidth of six units in each direction. Let the traffic matrix model be such that each traffic flow $T_i$ is less than or equal to 12 units and the sum of all traffic flows $T_i$ is less than or equal to 12 units. This is the maximum possible amount given the limit on the links. Let the delay on each of the links be 1 msec.

Consider two traffic flows $T_1$ and $T_2$ between nodes $N_3$ and $N_5$ and nodes $N_2$ and $N_4$, respectively, that satisfy the above traffic criteria. Let us compute the buffer required for each of the schemes. For the traditional VCAT scheme, one will need a buffer of 1 msec times six bandwidth units at each of $N_2$ and $N_3$. Whereas in the delay distributed VCAT technique of the invention, one can assign only six bandwidth units of buffer at $N_3$ and can still satisfy any traffic between the pair of nodes. Note that this is possible only because we can share the buffer at $N_3$ by the demand between $N_2$ and $N_4$, which is not possible in the traditional VCAT scheme.

Figure 4B:
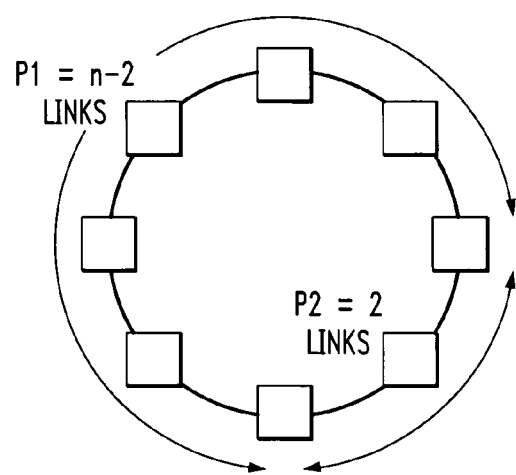

In general, for a ring of N nodes and N links such that the links are bandwidth limited by R units and have an equal delay as shown in FIG. 4B, consider a traffic model where each of the traffic flows is such that $T_i$ is less than or equal to 2R, the sum of $T_i$ is less than or equal to 2R, the traffic flows Ti are bi-directional, and the shorter of the paths is at least two links long. Then, the two paths in the worst case will have a difference of ((N−2)−2) link delays. We can send R units on each of the two paths. Then, the buffer requirements for the traditional VCAT scheme is (N−4)R whereas for delay distributed VCAT is 2(N−4)R/3. The factor of three is due the fact that the buffer can now be shared among three nodes (i.e., the source node, the destination node and a middle node). The factor of two is because we need buffers for each of the two directions. Thus, the net buffer required is reduced by a factor of ⅔. This is a substantial savings in the overall buffer requirement for the network.

The routing methodologies described above should be viewed as examples of routing methodologies in accordance with the invention, and it is to be appreciated that the invention can be implemented using other types of routing methodologies. The methodologies can be implemented in a distributed manner, in a centralized manner, or using a hybrid combination of distributed and centralized implementation, and the invention is not restricted in this regard.

A given one of the routing and design methodologies described above may be implemented in a network-based system comprising a plurality of network nodes. Exemplary network and network node implementations of the invention will now be described with reference to FIGS. 5, 6 and 7.

Figure 5:
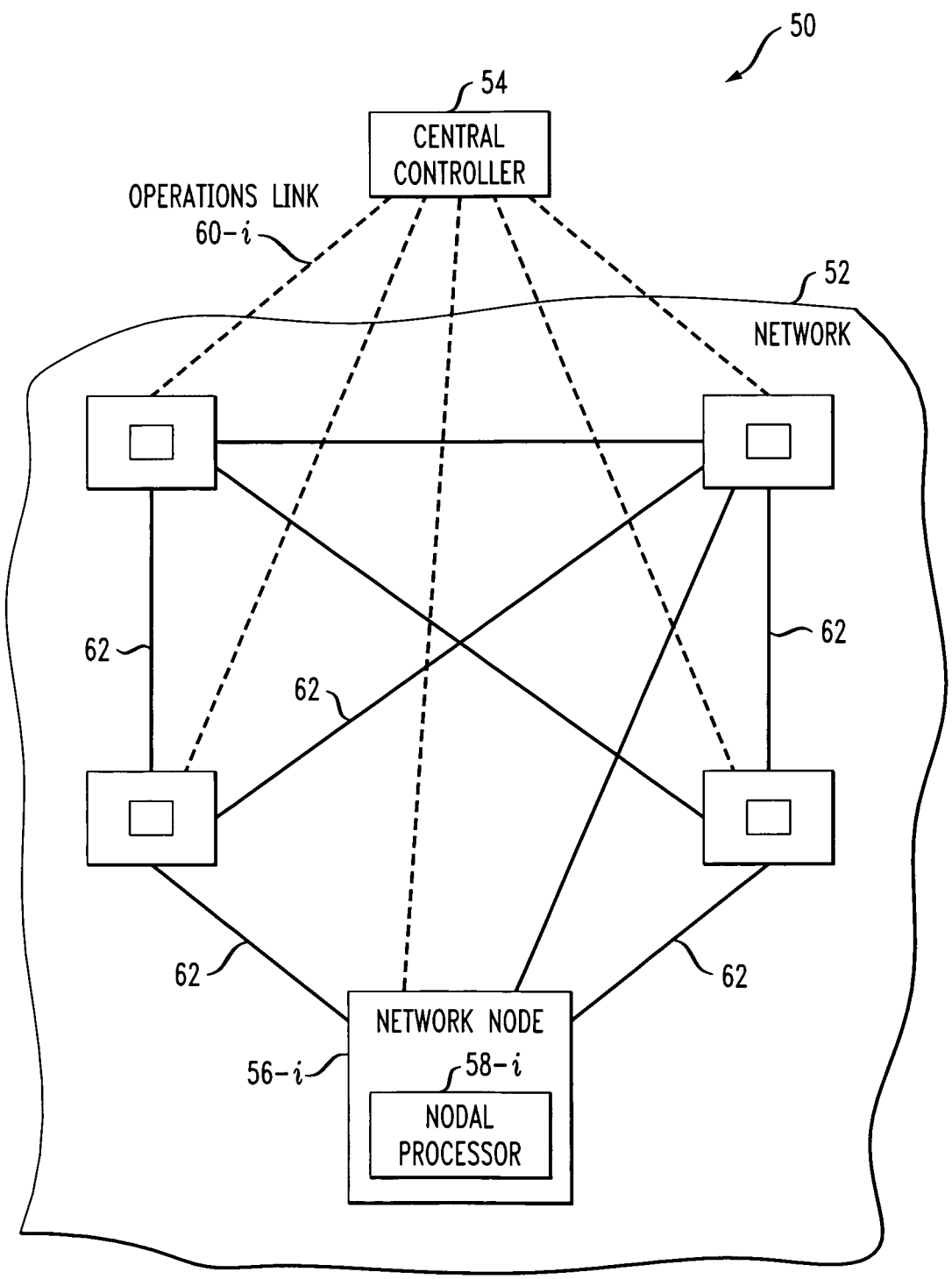
FIG. 5 shows an example network-based system in which a routing and design technique in accordance with the invention is implemented.

FIG. 5 shows an exemplary network-based system 50 in which techniques of the present invention can be implemented. Further, FIG. 5 may be considered an illustrative implementation of a network described above in the context of FIGS. 1 through 4B. The system 50 includes a network 52 and a central controller 54. It is to be appreciated that the invention may be utilized with any type of network. The network 52 includes a number of nodes 56-$i$, i=1, 2, . . . N. Each of the nodes 56-$i$ includes a corresponding nodal processor 58-$i$. The nodes 56-$i$ of network 52 are interconnected by, for example, optical fiber connections 62. In this example, each of the nodes 56-$i$ has a fiber connection to three other nodes. Each of the nodes 56-$i$ is also connected to the central controller 54 via a corresponding operations link 60-$i$, shown as a dashed line in FIG. 5.

The central controller 54 and nodes 56-$i$ may each represent a computer, server, router, gateway or other suitable digital data processor programmed to implement at least a portion of techniques of the present invention.

It should be noted that the system of FIG. 5 is considerably simplified for purposes of illustration. The invention is well suited for use in large-scale regional, national and international networks which may include many subnetworks, each having hundreds of nodes.

The central controller 54 may or may not participate in route determination techniques, depending upon the particular implementation. For example, a fully distributed implementation need not utilize the central controller 54.

Figure 6:
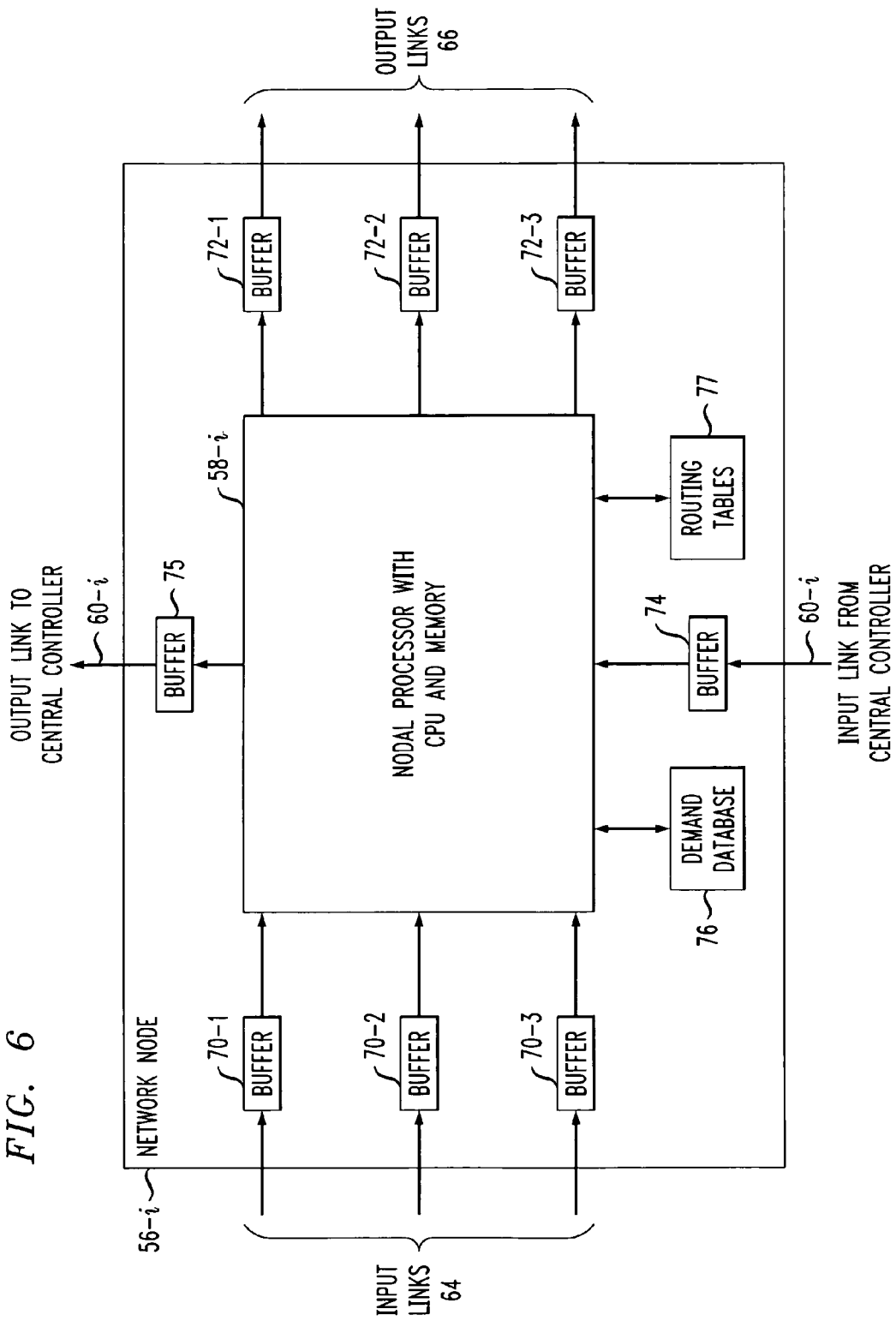
FIGS. 6 and 7 show different possible implementations of a given network node in the FIG. 5 system.

FIG. 6 shows one of the nodes 56-$i$ of network 52 in greater detail. Further, FIG. 6 may be considered an illustrative implementation of the nodes described above in the context of FIGS. 1 through 4B.

The node 56-$i$ includes a nodal processor 58-$i$ which includes a central processing unit (CPU) and memory. A set of input links 64, corresponding to fiber connections 62 with three other nodes, are connected to buffers 70-1, 70-2 and 70-3 in node 56-$i$. The node 56-$i$ supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

It is to be appreciated that such buffers may contain suitable memory capacity which is used to provide the distributed delay allocated to that particular node, in accordance with the principles of the invention. That is, in accordance with the delay distributed VCAT techniques of the invention, one or more of the buffers shown may store the VCAT data traffic routed thereto so as to introduce delay such that the total buffer requirement at the destination node is substantially reduced. For example, some subset or all of buffers 70 and 72 may be used to introduce such delay. Also, one or more additional buffers (not shown) placed at the input and/or output links may be used to provide such delay.

The operational link 60-$i$ of node 56-$i$ to the central controller 54 includes an input operational link which is coupled to nodal processor 58-$i$ via an input buffer 74, and an output operational link which receives signals from nodal processor 58-$i$ via an output buffer 75. The node 56-$i$ also includes a demand database 76 for storing demands for network capacity, and a set of routing tables 77 which specify routes through the network for particular demands. The demand database 76 and routing tables 77 may be components of a common memory within node 56-$i$, and may be combined with or otherwise associated with the memory of nodal processor 58-$i$. The node 56-$i$ has been simplified for purposes of illustration, and as noted above may include a substantially larger number of input and output links, as required for a given application.

Figure 7:
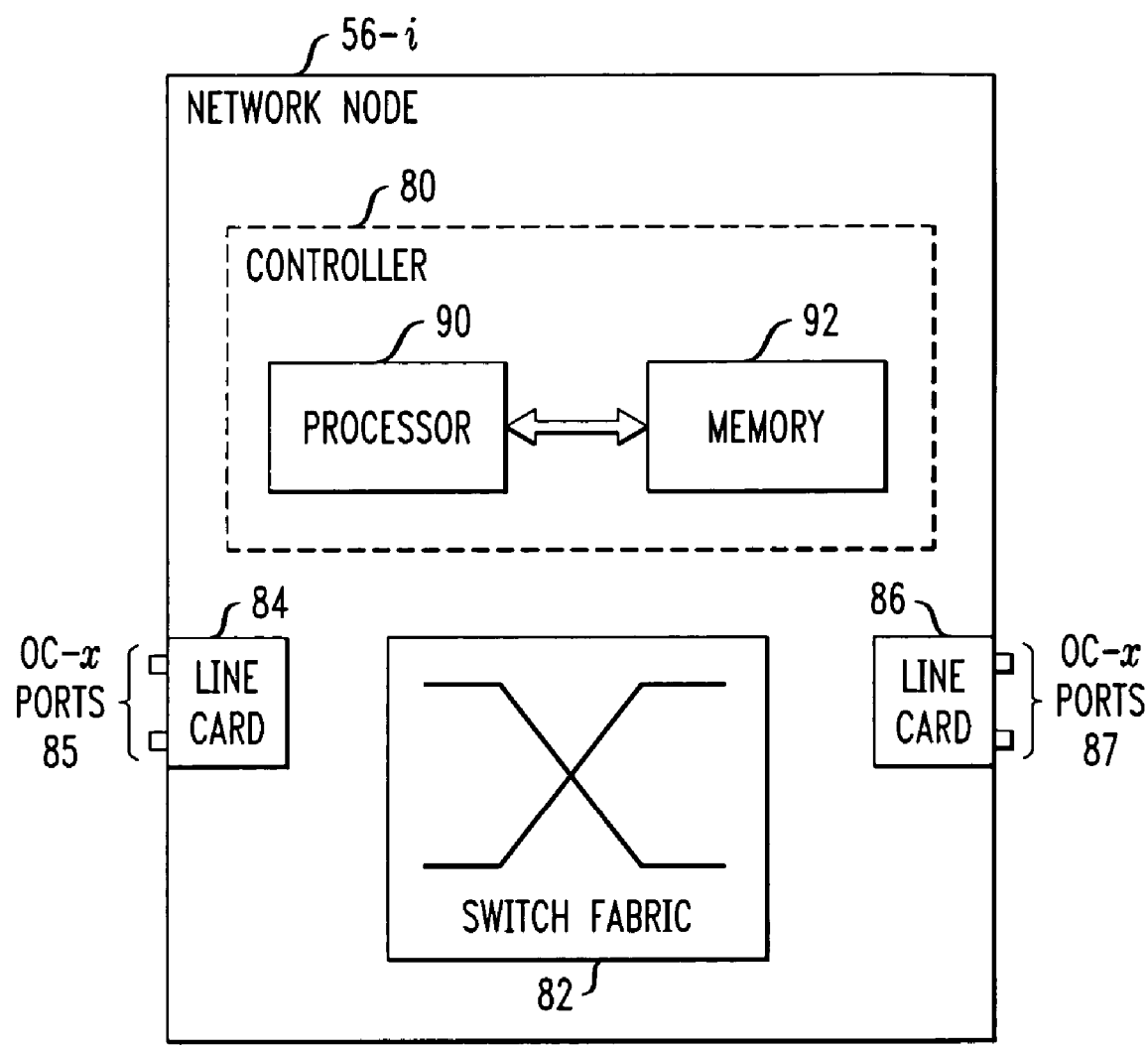

FIG. 7 shows another exemplary implementation of a given one of the network nodes 56-$i$ of the FIG. 5 network-based system.

The network node 56-$i$ in this example includes a controller 80, a switch fabric 82, a first line card 84 having a set of OC-x ports 85 associated therewith, and a second line card 86 having a set of OC-x ports 87 associated therewith. It should be understood that the node 56-$i$ has again been simplified for purposes of illustration. For example, the node 56-$i$ as shown in FIG. 7 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands, with the routes being determined at least in part using a routing algorithm of the present invention.

As indicated previously, the node 56-*i* may be an element of an optical network or other type of network which includes a very large number of nodes, and possibly a central controller. One or more of the nodes and the central controller may each represent a computer, processor-based switch or other type of processor-based device configured to provide routing and associated restoration in accordance with the invention.

The implementations described in conjunction with FIGS. 5, 6 and 7 are presented by way of example, and it is to be appreciated that the invention can be implemented in numerous other applications.

The above-described embodiments of the invention are intended to be illustrative only. For example, the techniques of the invention may be applied to any routing application, without regard to the type, arrangement or configuration of the network, network nodes, or communication protocols.

For example, although described in the context of virtually-concatenated EoS data traffic, the example routing algorithms described herein can be modified in a straightforward manner so as to be applicable to a wide variety of other types of data traffic.

Also, in alternative embodiments, the particular steps utilized in a given routing methodologies may be varied from those steps shown in the foregoing example routing methodologies.

These and numerous other alternative embodiments within the scope of the following claims will be readily apparent to those skilled in the art.

We claim:

1. A method of routing virtually-concatenated data traffic in a network comprising a plurality of nodes, wherein each node of the plurality of nodes is a network-level node separated from another network-level node of the plurality of nodes by at least one network-level link, the method comprising, for a given traffic demand to be routed from a source node to a destination node in the network, the steps of:
    determining two or more paths to route the given traffic demand, each of the two or more paths corresponding to a member of a virtually-concatenated group, wherein one path of the two or more paths comprises nodes of the plurality of nodes including a source node, a destination node and at least one other node coupled between the source node and the destination node, and further wherein at least two nodes of a set comprising the source node, the destination node and the one other node buffer at least a portion of the given traffic demand such that a delay is distributed over the at least two nodes of the one path; and
    routing the given traffic demand over the two or more determined paths;
    wherein the delay distribution is a function of at least one of the direction of the given traffic demand, the number of nodes that buffer at least a portion of the given traffic demand and a capacity of one or more network-level links.

2. The method of claim 1, wherein the one path is the shorter of the two or more determined paths.

3. The method of claim 1, wherein a differential delay associated with the two or more determined paths is substantially reduced at the destination node due to the delay associated with the one path being distributed over the one path.

4. The method of claim 1, wherein a buffer size required at the destination node is substantially minimized due to the delay associated with the one path being distributed over the one path.

5. The method of claim 1, wherein each of the source node, the destination node and the one other node of the one path delay at least a portion of the given traffic demand by a fixed amount.

6. The method of claim 1, further comprising the step of recombining respective members of the virtually-concatenated group at the destination node.

7. The method of claim 1, wherein the determining step is implemented at least in part in software running on a processor of a node or other element of the network.

8. The method of claim 1, wherein distribution of the delay over the one path permits traffic on the network that would otherwise not be admissible.

9. The method of claim 1, wherein one of the at least two nodes comprises the at least one other node.

10. The method of 1, wherein the at least two nodes comprise the at least one other node and at least one of the source node and the destination node.

11. Apparatus for use in routing virtually-concatenated data traffic in a network comprising a plurality of nodes, wherein each node of the plurality of nodes is a network-level node separated from another network-level node of the plurality of nodes by at least one network-level link, the apparatus comprising:
    a processor; and
    a memory coupled to the processor;
    wherein the processor is operative, for a given traffic demand to be routed from a source node to a destination node in the network, to perform the steps of:
    determining two or more paths to route the given traffic demand, each of the two or more paths corresponding to a member of a virtually-concatenated group, wherein one path of the two or more paths comprises nodes of the plurality of nodes including a source node, a destination node and at least one other node coupled between the source node and the destination node, and further wherein at least two nodes of a set comprising the source node, the destination node and the one other node buffer at least a portion of the given traffic demand such that a delay is distributed over the at least two nodes of the one path; and
    causing the given traffic demand to be routed over the two or more determined paths;
    wherein the delay distribution is a function of at least one of the direction of the given traffic demand, the number of nodes that buffer at least a portion of the given traffic demand and a capacity of one or more network-level links.

12. The apparatus of claim 11, wherein the apparatus is implemented in one of a distributed manner within one or more of the network nodes and a centralized manner utilizing a central controller.

13. The apparatus of claim 11, wherein the one path is the shorter of the two or more determined paths.

14. The apparatus of claim 11, wherein a differential delay associated with the two or more determined paths is substantially reduced at the destination node due to the delay associated with the one path being distributed over the one path.

15. The apparatus of claim 11, wherein a buffer size required at the destination node is substantially minimized due to the delay associated with the one path being distributed over the one path.

16. The apparatus of claim 11, wherein each of the source node, the destination node and the one other node of the one path are configured to delay at least a portion of the given traffic demand by a fixed amount.

17. The apparatus of claim 11, wherein distribution of the delay over the one path permits traffic on the network that would otherwise not be admissible.

18. The apparatus of claim 11, wherein one of the at least two nodes comprises the at least one other node.

19. The apparatus of 11, wherein the at least two nodes comprise the at least one other node and at least one of the source node and the destination node.

20. An article of manufacture comprising a non-transitory machine-readable medium storing one or more programs for use in routing virtually-concatenated data traffic in a network comprising a plurality of nodes, wherein each node of the plurality of nodes is a network-level node separated from another network-level node of the plurality of nodes by at least one network-level link, the one or more programs when executed in a processor, for a given traffic demand to be routed from a source node to a destination node in the network, performing the steps of:

determining two or more paths to route the given traffic demand, each of the two or more paths corresponding to a member of a virtually-concatenated group, wherein one path of the two or more paths comprises nodes of the plurality of nodes including a source node, a destination node and at least one other node coupled between the source node and the destination node, and further wherein at least two nodes of a set comprising the source node, the destination node and the one other node buffer at least a portion of the given traffic demand such that a delay is distributed over the at least two nodes of the one path; and causing the given traffic demand to be routed over the two or more determined paths;

wherein the delay distribution is a function of at least one of the direction of the given traffic demand, the number of nodes that buffer at least a portion of the given traffic demand and a capacity of one or more network-level links.

* * * * *